Jan. 27, 1953  L. STANTON  2,626,466
GAUGE FOR SWAGED SAWTEETH
Filed Nov. 1, 1948

INVENTOR,
Lon Stanton.
BY Roy E. Hamilton,
Attorney.

Patented Jan. 27, 1953

2,626,466

UNITED STATES PATENT OFFICE 2,626,466

GAUGE FOR SWAGED SAWTEETH

Lon Stanton, Lake Ozark, Mo.

Application November 1, 1948, Serial No. 57,700

4 Claims. (Cl. 33—202)

This invention relates to a gauge for swaged sawteeth, and has particular reference to a gauge that will give a like swage dimension at opposite sides of the body of the saw blade, to produce the desired smooth saw kerf.

The principal object of the present invention is the production of a gauge block having longitudinally aligned slots of different widths, one of said slots being of suitable width to snugly fit the body of the saw blade being dressed, and the other slot being of a width equal to the width of saw kerf to be cut.

A further object of the invention is the provision of centrally slotted block having longitudinally spaced-apart slots of different widths, the narrower of said slots being formed to snugly fit on the body portion of the saw being dressed whereby the block is adjustable to present the wider slot to a position over the swaged point of the saw tooth.

Other objects are simplicity and economy of construction, ease and accuracy of use, and adaptability for use with saws of different constructions and kerf cuts.

With these objects in view as well as other objects which will appear during the course of the specification, reference is had to the drawing wherein.

Figure 1:
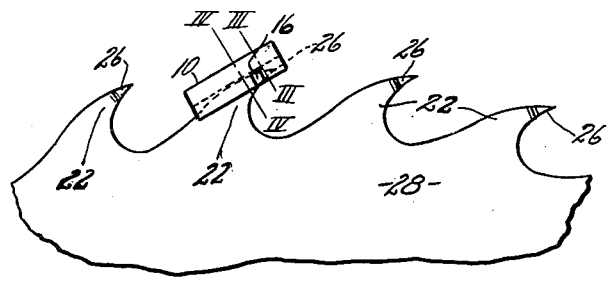
Figure 1 is a fragmentary elevational view of a circular saw with the swage gauge in operative position thereon.
Figure 2:
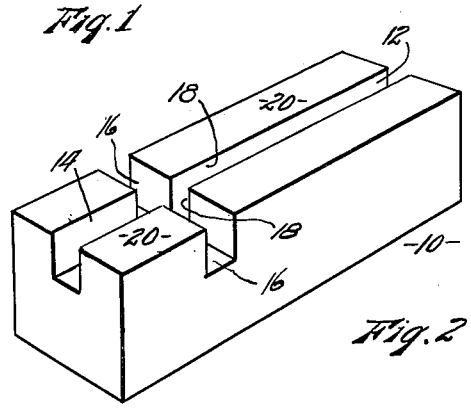
Fig. 2 is an enlarged perspective view of the swage gauge.
Figure 3:
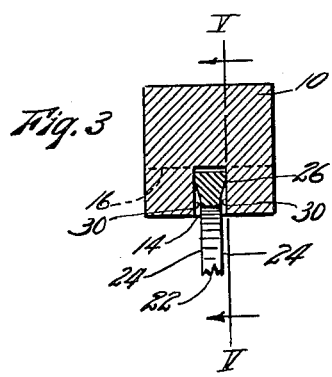
Fig. 3 is an enlarged cross sectional view taken on line III—III of Fig. 1.
Figure 4:
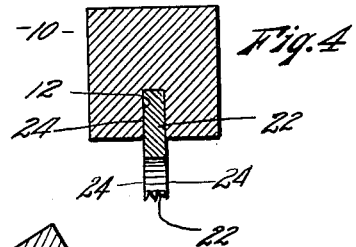
Fig. 4 is an enlarged sectional view taken on line IV—IV of Fig. 1.

Throughout the several views like reference characters refer to similar parts and the numeral 10 designates a rectangular block, preferably made of hardened tool steel and machined to accurate dimensions.

Centrally disposed in one side of block 10 is a pair of slots 12 and 14 and a transverse slot 16 adjacent one end of block 10 which separates slot 12 from 14. The slot 12 is relatively longer than slot 14, is of a thickness equal to the thickness of the body of the saw, which for example will be considered as $\frac{5}{32}$" or gauge 9. This slot is formed with side walls 18 disposed at right angles to the planar surface 20 of block 10 and milled to a depth of about .30" so that when the gauge is fitted on the saw tooth 22, the side walls 18 will engage the opposite parallel side walls 24 of the body 28 of the saw blade with the swaged portion 26 of tooth 22 positioned in slot 14. Slot 14 is centrally disposed relative to slot 12 and is of a width, for example, ¼", which is the desired width of the saw kerf. When the block is thus slotted and positioned on the saw tooth as shown, the saw body walls 24 will rest snugly against parallel walls 18 of slot 12 and will be spaced apart from parallel walls 30 of slot 14, $\frac{3}{64}$" to properly gauge the desired swage at opposite sides of the planar saw body. The dimensions used are only for the purpose of explaining the relation of the parts in a typical use.

The principal function of transverse slot 16 is to separate the slots 12 and 14 to permit of proper finishing of these slots through their entire length.

Figure 5:
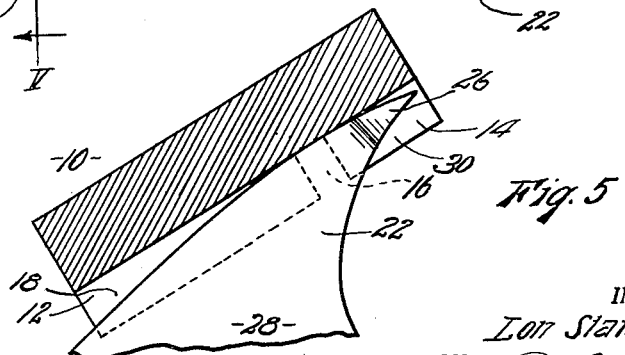
Fig. 5 is a sectional view taken on line V—V of Fig. 3.

In the use of this gauge block the tooth is first swaged by any suitable means, then the block is positioned with the saw body in slot 12, and then slot 14 is moved down to the swaged point 26 for checking, if the swaging is too wide at either side of the saw body it can be dressed down by filing. If the operator finds that the swaging extends only slightly beyond the desired width he may drive the swage block to position shown in Fig. 5 to shear off the excess swaging from either or both sides of the tooth point 26. When each tooth has been swaged and dressed to proper size as described, the saw will produce a smooth cut. Due to accuracy of this swage gauge, less swage or set of the teeth will be required, thus requiring less power and furthermore the timber supply will be conserved.

Since the use of this tool does not depend on special skill of the operator it will help an average workman to produce a well dressed saw, with all swaging equal with respect to the planar surfaces 24 of the body member.

While I have shown a saw made from a single sheet of metal it is quite apparent that this tool could be used for gauging other types of saw blades including those having inserted teeth, the only requirement being that the main body of the saw and the tooth present sections of uniform gauge suitable for close insertion in the slot 12 and a swaged cutting tooth point 26 suitable for being gauged in slot 14 as the gauge is secured in position on the body of the saw or of the tooth.

Swage gauge block may be made for use on any size and shape of saws without departing from the spirit of the invention.

What I claim as new and desire to protect by Letters Patent is:

1. A gauge for swaged sawteeth comprising an elongated block of steel continuously grooved along one of its sides, said groove being formed to present two longitudinally spaced portions of different widths, the inner side walls of both portions of said groove being parallel, and the centerlines of said portions being coincident.

2. A gauge for swaged sawteeth comprising an elongated block of steel continuously grooved along one of its sides, said groove being formed to present two longitudinally spaced portions of different widths but with their centerline coincident, the narrower portion of said groove being of a width to receive snugly the body portion of a saw blade, and the wider portion of said slot being of a width suitable to receive simultaneously the finished swaged point of the sawtooth.

3. A gauge for swaged sawteeth comprising an elongated block of steel continuously grooved along one of its sides, said groove being formed to present two longitudinally spaced portions of different widths, the centerline of said wider and narrower portions of said groove being coincident and having their inner side walls parallel, the narrower of said portions being of a width to fit snugly over the parallel side walls of a saw body and the wider of said portions being of a greater width to gauge simultaneously the swaged portion of a sawtooth.

4. A gauge for swaged sawteeth comprising an elongated block of steel continuously grooved along one of its sides, said groove being formed to present two longitudinally spaced portions of different widths but with their centerline coincident, said groove being of rectangular cross sectional form, the narrower of said groove portions being adapted to fit slidably over the saw body, and the wider of said groove portions being of a width equal to the desired saw kerf.

LON STANTON.

REFERENCES CITED

The following references are of record in the file of this patent:

UNITED STATES PATENTS

| Number | Name | Date |
|---|---|---|
| 101,229 | Clemson | Mar. 29, 1870 |
| 219,438 | Bigelow | Sept. 9, 1879 |
| 239,198 | Simonds | Mar. 22, 1881 |
| 387,875 | Harsen | Aug. 14, 1888 |
| 482,250 | Heath | Sept. 6, 1892 |
| 580,508 | Richardson et al. | Apr. 13, 1897 |
| 679,634 | McKnight | July 30, 1901 |
| 1,315,716 | Forester | Sept. 9, 1919 |
| 1,911,442 | Earl | May 30, 1933 |
| 2,021,770 | Farmer | Nov. 19, 1935 |